(12) United States Patent
Muise et al.

(10) Patent No.: US 6,391,357 B1
(45) Date of Patent: May 21, 2002

(54) METHOD OF TREATING FRESH PRODUCE

(75) Inventors: Herbert D. Muise, Tumwater; Robert H. Young, Tacoma, both of WA (US)

(73) Assignee: Weyerhauser Company, Federal Way, WA (US)

( * ) Notice: Subject to any disclaimer, the term of this patent is extended or adjusted under 35 U.S.C. 154(b) by 0 days.

(21) Appl. No.: 09/575,433

(22) Filed: May 22, 2000

(51) Int. Cl.[7] .......................... B65B 31/00; B65B 55/12
(52) U.S. Cl. ...................... 426/407; 426/415; 426/419; 383/103
(58) Field of Search ................ 426/407, 415, 426/419, 106, 118; 383/103

(56) References Cited

U.S. PATENT DOCUMENTS

| 5,171,593 A | | 12/1992 | Doyle ........................ 426/106 |
|---|---|---|---|
| 5,226,735 A | * | 7/1993 | Beliveau ..................... 383/103 |
| 5,458,899 A | | 10/1995 | Floyd et al. ................. 426/404 |
| 5,492,705 A | | 2/1996 | Porchia et al. .............. 426/106 |
| 5,556,658 A | * | 9/1996 | Raudalus et al. ............ 426/411 |
| 5,565,230 A | | 10/1996 | Bailey ........................ 426/411 |
| 5,619,841 A | * | 4/1997 | Muise et al. ................. 53/440 |
| 5,698,249 A | | 12/1997 | Hayashi et al. ............. 426/106 |
| 5,919,504 A | * | 7/1999 | Muise et al. ................ 426/106 |
| 6,190,710 B1 | * | 2/2001 | Nir et al. .................... 426/106 |

FOREIGN PATENT DOCUMENTS

| JP | 401226569 | * | 9/1989 |
|---|---|---|---|
| JP | 405168398 | * | 7/1993 |

* cited by examiner

Primary Examiner—Nina Bhat

(57) ABSTRACT

A method for packaging, cooling, and storing fresh produce is disclosed. The produce is placed in a plastic bag having apertures that control ventilation so as to admit a fumigant gas but prevent significant moisture loss. Multiple units of the bagged produce are, in turn, placed in a corrugated shipping container. Using the bag design shown it has been found that humidity of the cold storage environment may be safely reduced to about 65–75% without significant deterioration of the contained produce. This is in contrast with the usual 90% RH environment needed to prevent moisture loss. The reduced humidity environment effects a very significant improvement in shipping container compression strength. Storage at 70% RH, in contrast to storage at 90% RH, results in an almost 50% improvement in compression strength. The result is less damage to the containers and their contents. Somewhat lighter weight shipping containers are also suitable, resulting in reduced costs.

19 Claims, 2 Drawing Sheets

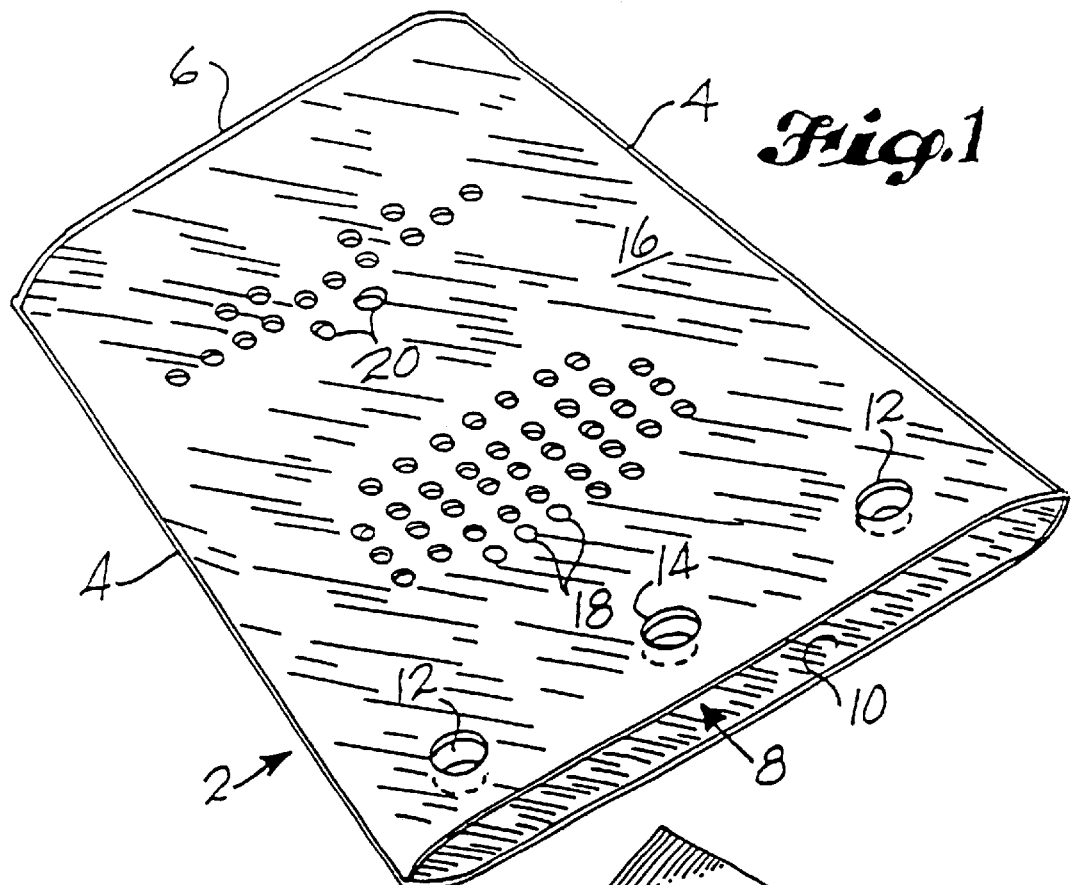
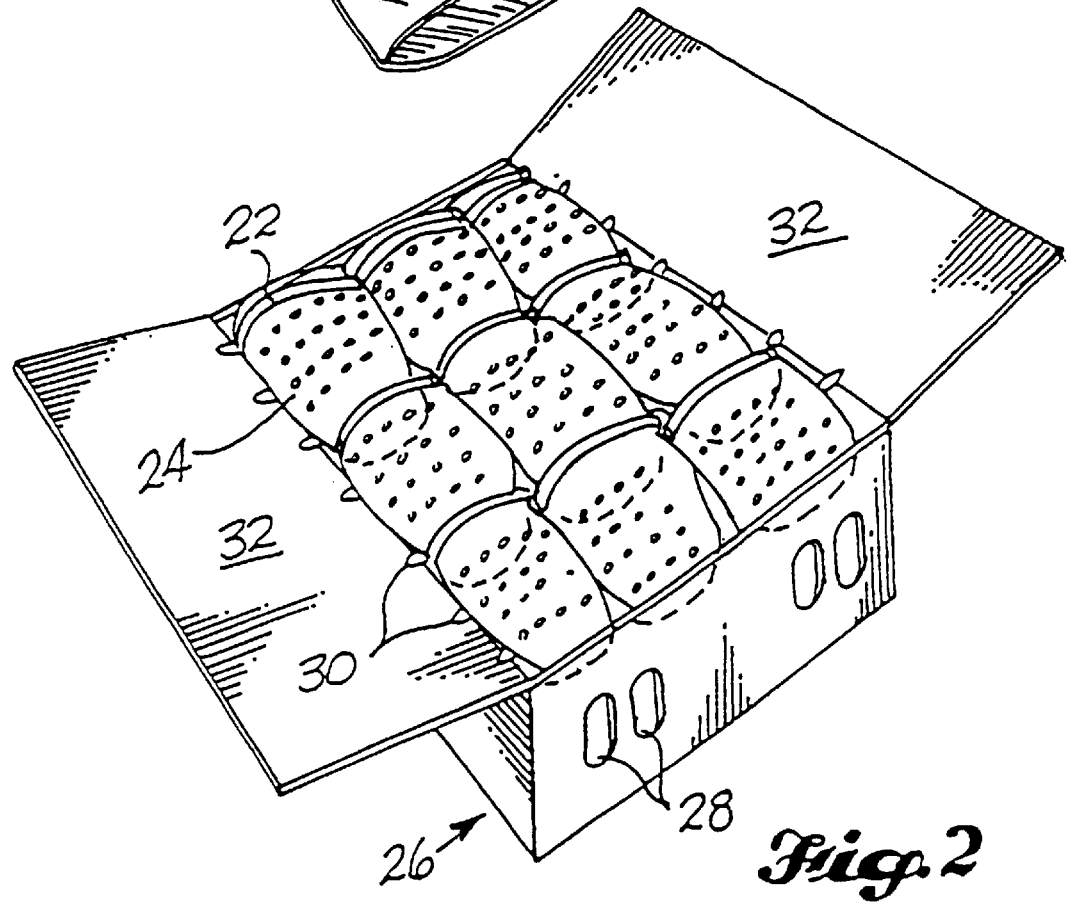

METHOD OF TREATING FRESH PRODUCE

This invention relates to a method of packaging, cooling, and storing fresh produce. While applicable to many crops it is particularly useful for table grapes.

BACKGROUND OF THE INVENTION

The miracle of modern storage and transportation systems has made fresh fruit and produce of the highest quality available year around. Even delicate offseason produce such as raspberries and strawberries find their way from growers in South America to tables in the United States while still in prime condition. Apples and pears are crisp and juicy six to nine months after they were picked. In part this is due to controlled atmosphere cold storage of fruit in which the oxygen level is reduced and carbon dioxide level is elevated. Periodic fumigation to prevent botrytis growth is routinely required of other products. Storage requirements for the particular product, at least in part, dictates the type of packaging used.

If table grapes might be used as an example, approximately 2 pounds (0.9 kg) is usually field packaged in individual ventilated bags. Most usually six to twelve bags are then placed in a single layer in a corrugated shipping container. The containers have side perforations to permit fumigation while in storage. Sulfur dioxide is the usual fumigant and treatment is typically on a weekly basis during storage.

One type of packaging for products requiring fumigation employs complex film enclosures having differing permeability to various gases. Floyd et al., U.S. Pat. No. 5,458,899; Bailey, U.S. Pat. No. 5,565,230; and Hayashi et al., U.S. Pat. No. 5,698,249; might be exemplary of this approach. Porchia et al., U.S. Pat. No. 5,492,705; and Doyle, U.S. Pat. No. 5,171,593; both describe bags having a multiplicity of microperforations which allow the product to breathe so that localized condensation and weight loss are minimized.

However, bags with overall perforations have not proved satisfactory for many products. If the perforations of a bag are in contact with the kraft paper surface of a corrugated shipping container, severe moisture loss of the contents will occur. The paper acts as a highly efficient desiccant to withdraw moisture from the product in the bag. To again use table grapes as an example, moisture loss from initial packaging until they appear on the grocer's shelves must be less than about 2%, otherwise browning and deterioration will begin to occur.

Two requirements must be met in produce bags for fumigated packaging. They must be tight enough so that product moisture is retained yet open enough so that fumigant can freely enter. These would appear to be almost mutually exclusive requirements. However, Muise et al., in U.S. Pat. No. 5,919,504, describe a produce bag having controlled ventilation properties that has successfully met both demands. This patent, commonly assigned with the present application, is hereby incorporated in its entirety by reference.

As was noted, table grapes are usually bagged and boxed in the field. They are then palletized and transported to a cold storage warehouse. Typically they are prechilled before entering storage and may receive an immediate fumigation. While several methods of prechilling are used, a so-called pressure cooler is the most common method. A number of pallets, usually about six or more, are placed end-to-end in a row with a second similar parallel row displaced a short distance so as to form a channel between them. Either a single or double height of pallets may be used, depending on the capacity of the system. The tops and one end of the pallet assembly are covered with a tarpaulin. The other end is maintained open. Cold air is forced in from the sides and flows through the boxed produce, down the channel, and out the open end where it is again cooled and recycled. Produce temperature is preferably reduced to the $0°-1°$ C. range in the pressure cooler whereupon the pallets are then transported to the cold storage warehouse kept at about the same temperature. Cold storage warehouses are most often maintained at about 90% relative humidity (RH) to reduce moisture loss of the produce.

At peak harvest times and in hot weather the available pressure cooler system may not have sufficient capacity to bring the entire pick down to $0°-1°$ C. Higher prechilling temperatures must be tolerated; e,g., about $4°-8°$ C., in order to treat the entire pick and avoid spoilage before the loaded pallets are placed in the warehouse.

One significant problem associated with high humidity cold storage conditions is loss of strength of the corrugated shipping containers. Edge compression strength of a container at 90% RH is only about half of that at 50% RH. This loss of strength can result in container failure and damage to the contents during storage and shipping. It is often compensated for by the use of heavier, and more expensive, containers. Muise et al., in U.S. Pat. No. 5,619,841, discuss this problem in detail. They describe a packaging system that uses an unperforated plastic bag within the corrugated container. The contained produce is sprayed with a predetermined amount of water and vacuum chilled. The bag prevents moisture loss but is not amenable to fumigation. However, this packaging system is amenable to storage at reduced relative humidity without loss of produce moisture. This patent is also commonly assigned with the present application and is included by reference.

The present invention particularly directed to a packaging and storage system for field produce that enables both reduced humidity storage and periodic fumigation

SUMMARY OF THE INVENTION

The present invention is a method for packing and storage of field produce. It is particularly directed to the problems of prevention of moisture loss from the produce while still allowing periodic fumigation, where this might be necessary, yet permitting a reduced relative humidity storage environment. The method also normally permits reduced prechilling time. In many circumstances the method allows some crops to be directly placed in the cold storage warehouse without any prechilling.

A key to the practice of the method is the use of ventilated bags designed to prevent moisture loss while allowing access to fungicidal fumigation gases. The produce is normally put into the bags in the field. These, in turn, are given a casual closure and appropriately placed in corrugated shipping containers which are then palletized. "Casual closure" is defined here as the open end of the bag being unsealed and simply loosely folded or rolled to contain the contents. The pallets are then directed to a cold storage warehouse where the temperature is held in the range of about $-1°-2.5°$ C. and the relative humidity is maintained below about 80%. Preferably the relative humidity is held in the range of about 65–75%, most preferably about 70% and the temperature in the range of about $0°-1°$ C.

The palletized packaged produce may be fully prechilled before placing in cold storage. Alternatively, for some crops, table grapes being an example, it is usually sufficient to only partially prechill the contents to a temperature in the range of about 4°–7° C. (39°–45° F.). In the case of table grapes it has also been discovered that they may be placed directly in the cold storage warehouse without any prechilling without quality deterioration due to moisture loss or fungal growth. The ventilated bags in which the produce is initially placed are key to the success of the reduced humidity storage method. The precise pattern of ventilation will depend somewhat on the crop being packaged. However, bags having only one side ventilated using perforations having an open area of about 0.35–2.0% of the ventilated surface have been found to be extremely useful. Preferably, the open area is in the range of about 0.4–1.0% of the ventilated surface. Ventilation is accomplished by placing a multiplicity of small holes having diameters in the range of about 3–5 mm (0.12–0.20 inches) in the bags, preferably about 2.5–4.6 mm (0.10–0.18 inches) in diameter.

It is necessary that the ventilation holes be only on one side of the bag.

Specifically, they should be on the side of the bag that will be on the top when the bags are placed in their corrugated shipping container. The reason for this is that kraft paper acts as an efficient desiccant. Where the ventilation holes are in contact with the corrugated container surface the effect is to cause unacceptable moisture loss from the bag contents.

It is an object of the invention to provide a method of reduced humidity cold storage for field produce that will control moisture loss but still permit fumigation.

It is another object to provide a method than enables the produce to be entered into cold storage with out precooling or with reduced precooling.

It is a further object to provide a method of cold storage that will reduce loss of shipping container strength due to moisture pickup.

These and many other objects will become readily apparent upon reading the following detailed description taken in conjunction with the drawings.

BRIEF DESCRIPTION OF THE DRAWINGS

FIG. 1 illustrates a ventilated bag particularly useful with the invention.

FIG. 2 illustrates produce filled bags placed in a shipping container.

DETAILED DESCRIPTION OF THE PREFERRED EMBODIMENTS

Figure 3:
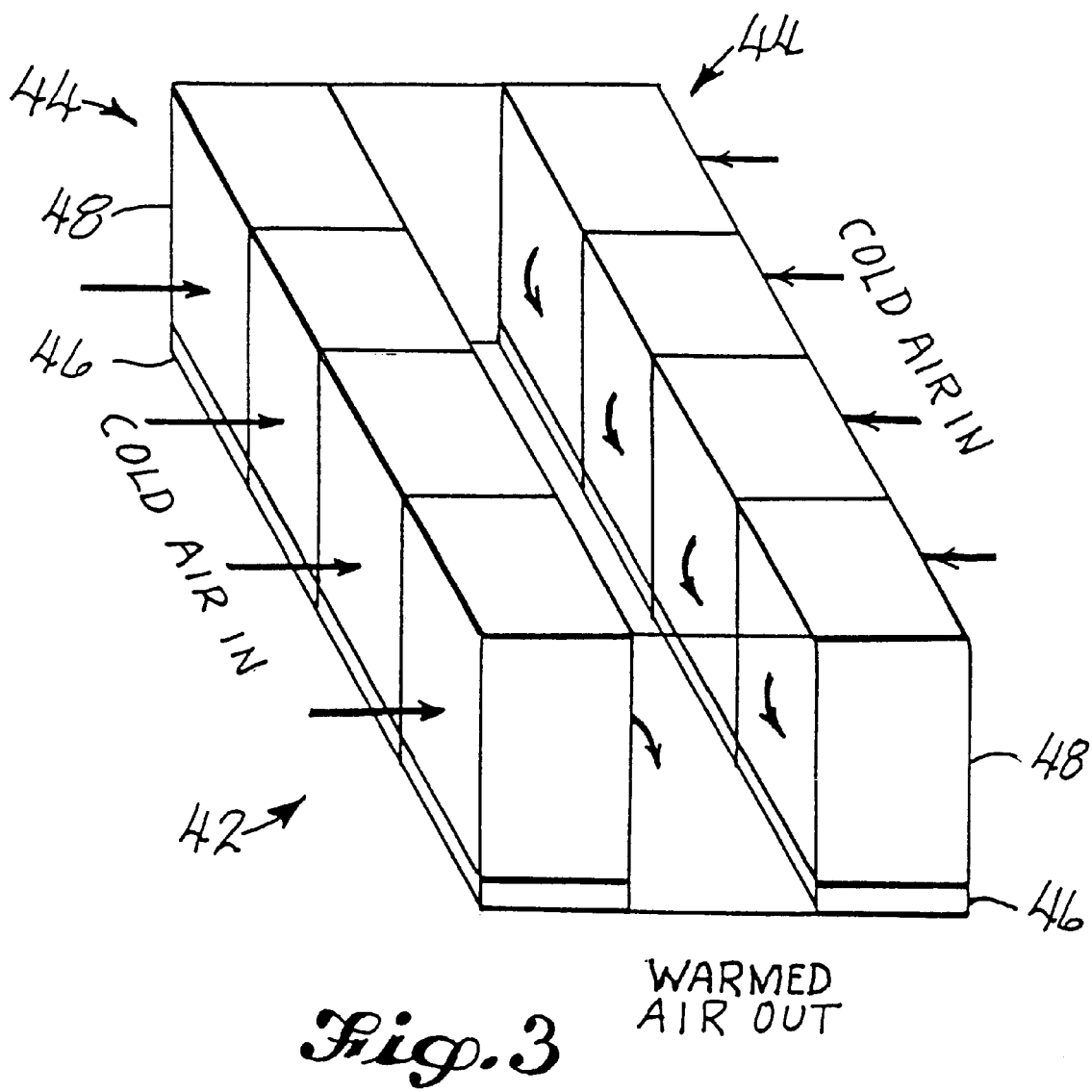
FIG. 3 illustrates a pressure cooler for prechilling produce prior to placement in cold storage.

The invention can now be readily understood by reference to the drawings. The bag, generally shown at 2, has sealed edges 4 and a sealed bottom 6. The upper end 8 is left open. A first or lower surface 10 is left imperforate except holes for 12 and 14 near the upper end. Holes 12 serve to hang the bag while it is being filled and finger holes 14 are finger holes to pull the bag open to enable rapid filling. The upper surface 16 of the bag contains a multiplicity of small holes or apertures 18, 20. These may be uniformly distributed over the upper surface 16 or arranged in two ranks as shown on FIG. 1. It is preferred that the majority of the perforations should be located above a transverse midline between the upper and lower edges.

The overall shape of the bag is not critical. It may be rectangular or it may be trapezoidal as is shown in the figure. If the contained product is table grapes, a trapezoidal bag is advantageous. A bunch of grapes is much wider at the proximal or stem end than at the other end and the trapezoidal shape more readily accommodates this configuration.

While, as was noted, the arrangement of holes 18, 20 is not critical, a patterned arrangement is nevertheless advantageous for some produce. Again, using table grapes as an example, these are usually packed in the field and on initial cooling there may be some condensation in the bag. This usually occurs at or near the bottom of the package. Free water in the package is undesirable since it encourages fungus growth. The lower rank of holes 20 serves to vent any condensed moisture.

Referring now to FIG. 2, after filling, the upper end 8 of the bag is loosely rolled to form a casual closure 22. The filled bag 24 is then placed in a shipping container, generally indicated at 26. The container has a plurality of punched apertures 28, 30 whish serve to admit fumigating gas. Optional upper flaps 32 close the box when filled. However, these do not contact the filled bags 24 to any significant extent. The filled bags are placed in the box in a single layer and may be somewhat overlapping in shingle fashion, with those at the far end being laid in first. The apertured second surface 16 is upward while imperforate surface 8 lies against the inside bottom surface of shipping container 26. While some holes 20 in the lower rank in the bag may be covered by an adjacent bag, sufficient remain open to serve their purpose of venting any condensation. The majority of the holes 18 are open to allow introduction of a fumigant gas.

Rather than using a small number of larger holes, it has been found that a multiplicity of small perforations are necessary for effective diffusion of fumigant gas into the filled bags. For an equal amount of open area, the diffusion rate with about 60–70 small perforations is almost 10 times as great as when only two or three holes having the same amount of area are used.

FIG. 3 is illustrative of a pressure cooler, generally indicated at 42. Two parallel rows of packaged produce 44 comprise a plurality of corrugated shipping containers 48 (individual containers not being shown) stacked on pallets 46. The rows are separated to leave a central channel between them. A tarpaulin (not shown) which covers the tops and the far end of the palletized assembly is then put in place. Chilled air is passed through the packaged produce from the sides of the containers. The air, warmed by the produce, is drawn through the channel and uncovered end where it is again chilled and recycled.

EXAMPLE

A bag holding an average of about 2 pounds of table grapes was made from low density polyethylene film having the following dimensions: length 13.1 inches (332 mm), width at the open upper end 12.1 inches (308 mm), and width at the sealed lower end 6.1 inches (154 mm). An upper ply of the bag was perforated with 70–⅛ inch (3.2 mm) diameter holes as will be described and a lower ply was left imperforate except for three service holes that were punched through both plies. Two service holes, each 1 inch (25 mm) in diameter, were punched below the upper edge for hanging while filling and a centered hole 0.6 inches (15 mm) diameter, located between these, was placed to assist the field worker in opening the bag for filling.

The upper rank of ventilation holes comprised 54 holes arranged in 5 rows. From the top down, the rows contained respectively 8, 12, 12, 12, and 10 holes on 0.65 inch (15 mm) centers, the rows being 0.5 inches (12.7 mm) apart and the upper row being located 4.0 inches (101.6 mm) from the upper edge of the bag. All of these holes were on or above a transverse line midway between the upper and lower edges of the bag. The lower rank of holes had 16 holes in three rows. The upper row had 2, the next 10, and the lowest had 4 holes. These were of equal size and general spacing to the upper rank. Total open area of the ventilation holes was 0.72% of the upper ply of the bag.

Grapes were picked early in the morning, under minimum field stress, and on a separate occasion about mid-day under moderate to high field stress conditions. Conventional slitted grape bags were also packed at the same time as the perforated bags for comparison. Both types of bag were then placed in standard corrugated shipping containers. In addition, the slitted bags were also placed in Styrofoam® shipping containers, nominally regarded as reducing moisture loss. The packaged grapes were prechilled to about 1.6° C. then placed into storage for six weeks at 0.5°–1.6° C., (31°–35° F.) under normal conditions of about 90% RH and also at low humidity of about 56% RH. Moisture loss of the grapes from field to end of cold room storage time under the various test conditions is given in the following two Tables.

TABLE 1

Moisture loss from grapes packed under low field stress conditions

| Packaging | 90% RH Storage | 56% RH Storage |
|---|---|---|
| Flat corrugated - Slitted bags | −1.8% | −6.0% |
| Styrofoam ®- Slitted bags | −1.1% | −9.6% |
| Flat corrugated - Perforated bags of Example | −1.1% | −2.5% |

TABLE 2

Moisture loss from grapes packed under high field stress conditions

| Packaging | 93% RH Storage | 58% RH Storage |
|---|---|---|
| Flat corrugated - Slitted bags | −3.6% | −5.7% |
| Styrofoam ®- Slitted bags | −3.4% | −9.2% |
| Flat corrugated - Perforated bags of Example | −1.8% | −3.8% |

The moisture loss using the perforated bags in conventional corrugated containers as compared to slitted bags is consistently reduced by a factor of about two over all from field to end of storage period. The reduction in moisture loss measured during the cold room storage period only was about four times. The Styrofoam® containers performed significantly poorer in this test than the corrugated containers.

While overall moisture loss at 56–58% RH was somewhat greater than desired, this is an extreme reduced humidity condition. In other tests, moisture loss during storage at a preferred 70% RH, even for the highly field stressed grapes, was in the desired range below about 2%.

It is well known that corrugated paper boxes absorb moisture when transferred from ambient conditions to a 90% RH and 0°–1.6° C. temperature environment of a typical cold storage warehouse. The moisture content of the box can increase from about 7% by weight at 50% RH to about 16%. This results in a decrease in box performance, measured as box top-to-bottom compressive strength of about 50%. For this reason, box designers overdesign the box to allow for this loss in performance as well as other potential abuses. Box moisture content and crush resistance was measured on the corrugated containers used in the above table grape moisture loss experiments. These containers were 20×16× 4¾ inches (50.8×40.6×12.1 cm) with side walls of 73/33/76 pound basis weight corrugated board and end walls of 69/33/69 pound basis weight board. Similar measurements were also made on control boxes containing no produce but maintained under the same conditions of time, temperature and humidity.

TABLE 3

Moisture gain and crush resistance of corrugated boxes under cold room conditions

| Package | Moisture at 90% RH, % | Box compression, kg | Moisture at 56% RH, % | Box compression, kg |
|---|---|---|---|---|
| Slitted bags | 16.5 | 750 | 9.5 | 1432 |
| Perforated bags | 15.4 | 773 | 8.3 | 1627 |
| No bags | 16.0 | 822 | 7.5 | 1706 |

At 70% RH storage conditions the container using the perforated bags of the example would be expected to have a moisture content of 12.5–13% and compression strength of about 1200–1210 kg. This represents a greater than 50% gain in compression strength. Thus it can be seen that storage at 70% humidity, using the perforated bags described in U.S. Pat. No. 5,919,504, represents a major gain in corrugated container performance with no significant loss of produce quality.

It will be apparent to those skilled in the art that many minor modifications not specifically disclosed herein could be made in the bag and packaging method described. These should be regarded as being within the scope of the invention if encompassed within the following claims.

What is claimed is:

1. A method for packing and cold storage of produce which comprises:

placing the freshly picked produce in ventilated bags, the bags minimally perforated so as to prevent significant moisture loss while having sufficient open area to permit fumigation gases to enter;

making a casual closure of the bags;

placing the bags in a single layer in a shipping container so that the bag perforations are not in contact with the shipping container;

palletizing the filled shipping containers;

placing the palletized containers in cold storage and cooling to a temperature in the range of about −1° to 2.5° C. at a relative humidity no greater than about 80%; and retaining the packaged produce at this temperature and relative humidity until the produce is shipped to market.

2. The method of claim 1 in which the relative humidity is about 65–75%.

3. The method of claim 1 in which the packaged produce is first at least partially cooled prior to placing in cold storage.

4. The method of claim 3 in which the precooling reduces the temperature to at least about 4°–7° C. (39°–45° F.) prior to placing in cold storage.

5. The method of claim 1 in which the produce is placed directly in cold storage without precooling.

6. The method of claim 1 in which the ventilated bags have two major surfaces with a first surface being imperforate and the second surface perforated with a multiplicity of holes so as to have an open area of about 0.35–2.0% of the second surface area, the second surface being placed upward in the shipping container to permit access of fumigating gases.

7. The method of claim 6 in which the second surface has an open area of about 0.4–1.0% of the second surface area.

8. The method of claim 6 in which the perforations are in the range of 3.0–4.6 mm (0.12–0.18 inches) in diameter.

9. The method of claim 6 in which the perforations are in the range of 2.5–5 mm (0.1–0.2 inches) in diameter.

10. The method of claim 1 in which the produce is table grapes.

11. A method for packing and cold storage of produce which comprises:

placing the freshly picked produce in ventilated bags, the ventilated bags having two major surfaces with a first surface being imperforate and the second surface perforated with a multiplicity of holes so as to have an open area of about 0.35–2.0% of the second surface area, the second surface being placed upward in the shipping container to permit access of fumigating gases, the bags preventing significant moisture loss while having sufficient open area to permit fumigation gases to enter;

making a casual closure of the bags;

placing the bags in a single layer in a shipping container;

palletizing the filled shipping containers;

placing the palletized containers in cold storage and cooling to a temperature in the range of about −1° to 2.5° C. at a relative humidity no greater than about 80%; and retaining the packaged produce at this temperature and relative humidity until the produce is shipped to market.

12. The method of claim 11 in which the relative humidity is about 65–75%.

13. The method of claim 11 in which the packaged produce is first at least partially cooled prior to placing in cold storage.

14. The method of claim 13 in which the precooling reduces the temperature to at least about 4°–7° C. (39°–45° F.) prior to placing in cold storage.

15. The method of claim 11 in which the produce is placed directly in cold storage without precooling.

16. The method of claim 11 in which the second surface has an open area of about 0.4–1.0% of the second surface area.

17. The method of claim 11 in which the perforations are in the range of 3.0–4.6 mm (0.12–0.18 inches) in diameter.

18. The method of claim 11 in which the perforations are in the range of 2.5–5 mm (0.1–0.2 inches) in diameter.

19. The method of claim 11 in which the produce is table grapes.

* * * * *